United States Patent [19]

Sontheimer et al.

[11] Patent Number: 4,734,604
[45] Date of Patent: Mar. 29, 1988

[54] FRICTION BRAKING SYSTEM AND APPARATUS FOR APPLIANCE INDUCTION MOTOR DRIVE

[75] Inventors: Carl G. Sontheimer, Greenwich; William R. Smith-Vaniz, Darien, both of Conn.

[73] Assignee: Cuisinarts, Inc., Greenwich, Conn.

[21] Appl. No.: 892,767

[22] Filed: Aug. 1, 1986

[51] Int. Cl.$^4$ .............................................. H02K 7/10
[52] U.S. Cl. ....................................... 310/76; 310/62; 310/77; 310/92; 310/191; 188/171; 192/12 D
[58] Field of Search ................... 310/191, 209, 76, 77, 310/62, 78, 92, 63, 93, 166, 80; 188/171; 192/2, 12 D, 18 B, 176, 67 R

[56] References Cited

U.S. PATENT DOCUMENTS

| | | | |
|---|---|---|---|
| 2,677,256 | 5/1954 | Donandt | 310/209 |
| 2,727,163 | 12/1955 | Meyer | 310/77 |
| 3,032,667 | 5/1962 | Sorchy | 310/77 |
| 3,683,217 | 8/1972 | Agalakov | 310/77 |
| 4,241,302 | 12/1980 | Benjamin | 318/759 |
| 4,285,473 | 8/1981 | Williams | 74/417 |
| 4,381,048 | 4/1983 | Haverkamp | 192/2 |
| 4,395,670 | 7/1983 | Podell | 318/762 |

FOREIGN PATENT DOCUMENTS

0959840 3/1957 Fed. Rep. of Germany ........ 310/76

*Primary Examiner*—R. Skudy
*Attorney, Agent, or Firm*—Parmelee, Bollinger & Bramblett

[57] ABSTRACT

A friction braking system located entirely inside an induction motor of an appliance quickly stops rotation of the rotor in the appliance motor, for example such as a food processor, whenever the A.C. electrical power is turned off. Thus, rotation of any tool being operated in the appliance is quickly stopped, whenever the electrical power is interrupted. The rotor in the induction motor is axially slidably mounted on the motor shaft and is keyed to the shaft for permitting axial shifting displacement of the rotor relative to the stator while preventing any angular displacement of the rotor relative to the shaft. Consequently, the rotor and shaft always turn and stop as a function unit. A friction brake lining is affixed within the motor housing offset from the axis of the motor shaft as far as practicable. A disc brake mounted onto the rotor has an annular friction braking surface positioned for engagement against the brake lining. The rotor is arranged for an axial thrust to shift the rotor in an axial direction away from its normal operating position aligned with the stator, whenever the electrical power is interrupted, thereby applying friction braking action quickly and at a relatively large moment arm as compared with the radius of the rotor for effective braking. The brake disc may include motor-cooling fan blades. An inverted V-shaped brake surface configuration is also shown for enhancing braking action.

7 Claims, 9 Drawing Figures

FRICTION BRAKING SYSTEM AND APPARATUS FOR APPLIANCE INDUCTION MOTOR DRIVE

FIELD OF THE INVENTION

The invention is in the field of friction braking for the induction motor drives of home electrical appliances, such as food processors, and more particularly relates to a friction braking system located totally within the housing of an induction motor in a home electrical appliance.

BACKGROUND

There are home electrical appliances having single-phase induction motors for driving work-performing tools, for example such as electrical kitchen appliances, including food processors, blenders, choppers, beaters, whippers, grinders, slicers, and the like. In such appliances having work-performing tools it is desired that the tool stop rotating as quickly and smoothly as possible, whenever the A.C. electrical power is turned off or interrupted in any way.

Induction motors are often incorporated in such home appliances, because the induction motor is reliable and quiet and usually offers a long trouble-free, maintenance-free operating life. Moreover, single-phase induction motors have predetermined relatively narrow ranges of operating speed as determined by the number of magnetic poles in the stator. In other words their operating speeds, within their rated loading limits, are not greatly affected by the working loads imposed upon the driven tool. These operating characteristics of single-phase induction motors are very well suited to certain types of home appliances, for example food processors, in which the induction motor drives usually operate at a speed in the range from about 1715 RPM to about 1765 RPM, depending upon the particular design of the induction motor being used. The working tool in a food processor is located in a bowl and is often directly driven from an extension of the motor shaft.

The rotors of well-built single-phase induction motors are relatively heavy, and consequently they have considerable momentum when running at normal operating speed and are capable of coasting for a considerable time after the electrical power to the motor is turned off or interrupted.

Various electromagnetic braking systems have been disclosed for braking the rotation of rotors in food processors when the electrical power is turned off or interrupted, as disclosed in the following U.S. Pat. Nos.: 4,241,302—Benjamin and 4,395,670—Podell. These elctromagnetic braking systems have proved commercially successful.

There is also a friction braking system disclosed for a commutator-type motor, often called a "universal motor" because it will operate on either A.C. (alternating current) or D.C. (direct current) electrical power, in a food processor disclosed in FIGS. 13–18 of U.S. Pat. No. 4,285,473-Williams. Such universal motors usually run at a rate of speed many times faster than an induction motor and they provide considerably less torque output. Therefore, they need a speed-reducing, torque-increasing mechanical transmission when used in a food processor, as will be seen in the above-identified Williams patent. The friction brake system in the Williams patent is located entirely outside of the motor housing and includes a considerable number of mechanical components.

SUMMARY

The present invention provides a friction braking system located entirely inside of an induction motor housing which quickly stops rotation of the rotor in an appliance, for example such as a food processor, whenever the A.C. electrical power is turned off or interrupted. Thus, rotation of any motor-driven tool being operated in the appliance is thereby quickly stopped.

In accordance with the invention, the rotor in the induction motor is axially slidably mounted on the motor shaft and is mechanically keyed to the shaft for permitting axial shifting or displacement of the rotor relative to the stator while preventing any angular displacement of the rotor relative to the shaft; so that the rotor and its shaft always turn and stop as a functional unit.

Within the housing of the induction motor a friction brake lining of wear-resistant material having a relatively high coefficient of friction, for example of material similar to an automobile brake lining or brake pad, is fastened in a fixed position. This brake lining or brake pad is offset from the axis of the motor shaft as far as practicable within the housing in order for the braking system to be operating at as great a mechanical advantage, i.e. at as long a moment arm, as possible relative to the radius of the rotor. There is a disc brake element mounted onto the rotor, and this disc turns and stops with the rotor. This disc element has an annular friction braking surface positioned in closely spaced opposed relationship to the brake lining when the induction motor is running. In other words, this annular friction braking surface of the disc is positioned ready for quick engagement with the wear-resistant brake lining.

The axially shiftable rotor has an axial thrust continually applied thereto by gravitational force and/or by spring force. Thus, the rotor shifts in an axial direction away from its normal operating position aligned with the stator, whenever the electrical power is turned off or interrupted, thereby engaging the disc against the brake lining. The resultant friction braking action is applied quickly and effectively, being at a relatively long moment arm compared with the radius of the rotor.

An alternative embodiment the brake disc is shown to include motor-cooling fan blades in association with cooling windows. In another embodiment the brake lining and the opposed annular surface of the disc are configured for increasing their total area of frictional contact available within a given radial span and for augmenting the force applied normal (perpendicular) to the friction braking surfaces for a given axial thrust on the rotor.

When electrical power is supplied to the motor, the stator winding becomes energized. The strong magnetic field of the stator quickly pulls the rotor into axial alignment with the stator. The instant that the rotor starts to shift axially, towards its normal running position, the brake disc separates from the brake lining (brake pad) and the rotor is free to start rotating as it is shifting back into its normal running position in axial alignment with the rotor.

This advantageous friction braking system may be employed in addition to or in lieu of the electromagnetic braking systems for appliance induction motors described in the patents referenced above.

BRIEF DESCRIPTION OF THE DRAWINGS

The invention, together with further aspects, objects, features and advantages thereof will be more clearly understood from a consideration of the following description taken in connection with the accompanying drawings which are arranged for clarity of illustration and not necessarily to scale, and in which like reference numerals are used to refer to corresponding elements throughout the various views.

DETAILED DESCRIPTION OF PREFERRED EMBODIMENTS AND THEIR OPERATION

Figure 1:
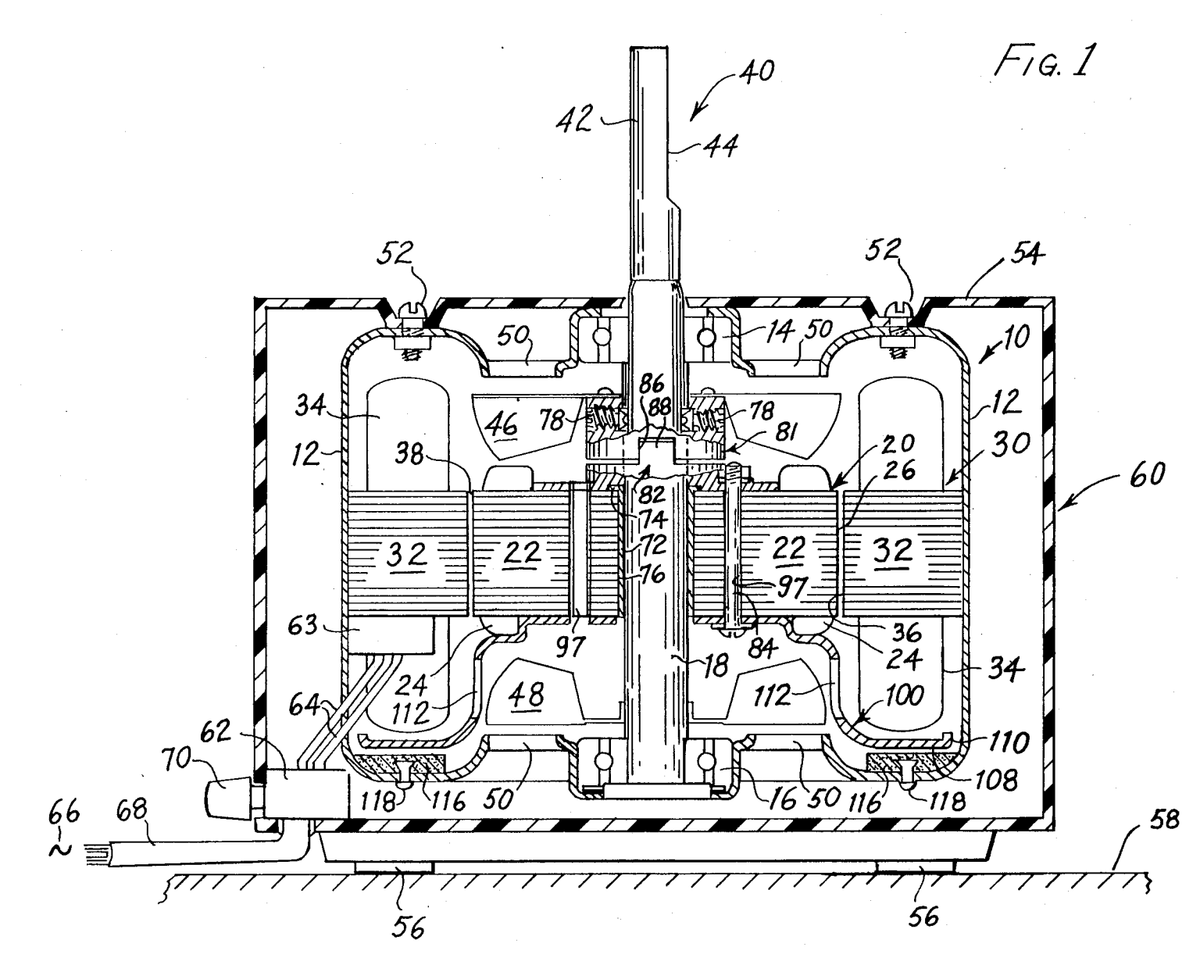
FIG. 1 is an elevational sectional view of an induction motor embodying the present invention and being mounted in an electrical appliance. The motor is shown in its running position with the brake off.

In FIG. 1 is shown an induction motor 10 having a housing 12 with first and second ball bearing units 14 and 16, respectively, mounted within the housing 12 at first and second ends of the housing. A motor shaft 18 is carried by this pair of ball bearing units 14, 16 for rotation of the motor shaft 18 with very low frictional inpedance. The rotor 20 of this induction motor 10 is mounted on the motor shaft 18. This rotor 20 includes conventional multiple laminations 22 of transformer iron and a conventional rotor winding 24 of electrically conductive material of high conductivity, for example of copper or aluminum. This rotor winding 24 passes through conventional openings or slots (not shown) in the laminations 22 and may be fabricated in various conventional ways, as may be desired, depending upon motor parameters, for example the induction motor size, its Horsehpower rating, its desired torque-versus-speed characteristics, and so forth, as known in the art of induction motor design.

The axis of the motor shaft 18 is considered to be the axis of the induction motor 10, and the rotor 20 is generally concentric about this axis. The periphery or outer surface 26 of the rotor laminations 22 has the general overall configuration of a right circular cylinder as is conventional in induction motors.

Mounted stationary within the housing 12 is a stator 30 including conventional multiple laminations 32 of transformer iron and a conventional stator winding 34 of electrically conductive material of high conductivity, for example copper or aluminum. This stator winding 34 passes through conventional openings or slots (not shown) in the laminations 32 and may be fabricated in various conventional ways, as may be desired, depending upon the motor parameters for example such as those mentioned above. The stator 30 is generally concentric about the axis of shaft 18 and the stator 30 encircles the rotor 20.

The interior or inner surface 36 of the stator laminations 32 has the general overall configuration of a right circular cylinder as is conventional in induction motors. The inner surface 36 of the stator is closely spaced from the outer surface 26 of the rotor, and the narrow space 38 between the stator and rotor surfaces 26 and 36 is often called "the air gap" or simply "the gap".

When the stator winding 34 is appropriately energized by alternating current in any of several conventional ways as known in the induction motor art, this A.C. electrical power in the winding 34 creates a strong alternative magnet field in the gap 38 having a rotating action or rotating magnetic and electrical induction effect on the rotor 20, thereby causing induced current to flow in the rotor winding 24 and causing the rotor to turn for delivering mechanical power from the motor shaft 18.

In order to transfer mechanical power from the motor shaft 18 to tools or equipment (not shown) to be driven by the motor 18 this shaft has power take-off means 40 thereon. For example, as shown in FIG. 1 the power take-off means 40 includes an end 42 of the motor shaft 18 extending outside of the casing 12 with at least one positive engagement surface 44 thereon, which is not concentric with the axis of the motor shaft, for example, such as a flat area, a keyway, a notch, a spline, screw threads with lock nuts thereon, and so forth.

For circulating cooling fluid within the motor casing, such cooling fluid usually being air, there are first and second fan impellers 46 and 48 located near the first and second ends of the motor housing. These fan impellers are mounted for rotation with the motor shaft 18 and rotor 20. For enabling cooling air to be drawn into and to be expelled from the housing 13, there are a plurality of cooling ports 50 formed or punched out of the ends of the motor housing 12, which may be made of metal such as steel or suitable strong, rigid, tough durable fiber-reinforced plastic.

The induction motor 10 is shown mounted in fixed position within an electrical appliance 60 having foot pads 56; for example, mounted by fastening means 52 such as a plurality of bolts and nuts attaching the motor housing 12 to the casing 54 of the appliance 60. There are several home electrical appliances in which an induction motor 10 embodying the present braking invention can be used to advantage, e.g. such as food processors. In the present illustrative example, the electrical appliance 60 is of a type intended to have its foot pads 56 placed upon a horizontal work surface 58, for example upon a table top, work bench or counter top with the axis of the motor shaft 18 oriented vertically for reasons to be explained later.

In order to turn the motor 10 on and off, this electrical appliance 60 includes at least one control switch 62. There may be other switches (not shown) in addition to this motor control switch 62, for example such as one or more interlock switches, and there is a thermal overload protection switch 63 for interrupting the flow of electrical power to the stator winding 34 if the motor starts to overheat. The stator winding 34 has insulated electrical power supply leads 64 connected to the control switch 62. A suitable source 66 of alternating current (AC) electrical power is connected by electrical power cord line 68 to the switch 62. Thus, when the switch 62 is turned on by a manual control 70, the AC power is fed from the source 66 into the stator winding 34 for creating a strong magnetic field in the gap 38 as described above for causing the rotor 20 to rotate.

The source 66 of AC power is shown as single phase for the type of induction motor in which the present braking system is shown incorporated. In other words, the present invention may be incorporated in various induction motors, but we believe the invention will find its most widespread use in single-phase motor driven electrical appliances and tools used in or about a residence, for example such as electrical kitchen appliances, e.g. food processors, blenders, choppers, beaters, whippers, grinders, slicers, cutters, and the like.

In order to apply quick and effective braking action to the rotor 20 and to motor shaft 18 for rapidly stopping rotation of the power take-off means 40, whenever the flow of electrical power to the stator winding 34 is interrupted by the control switch 62 or by thermal overload swich 63 or by any other switch which may be operatively associated with the motor 10, a novel friction braking method and apparatus are provided by the present invention now to be explained. The rotor 20 is axially slidably mounted on the motor shaft 18 by a sleeve bearing 72 for permitting the rotor to be shifted in axial position relative to the motor shaft and stator. This sleeve bearing 72 has a flange 74 for holding the bearing in place within the shaft bore 76 in the laminations 22.

In order to slidably key the rotor 20 to the motor shaft, there is a first coupling or keying element 81 (please see also FIGS. 5 and 6) affixed to the shaft by suitable fastening means 78, for example such as a fixed key connection or by set screws, as shown in FIG. 1. There is a second coupling or keying element 82 (please see also FIGS. 7 and 8) affixed to the rotor laminations 22 by suitable attachment means 84, for example three rivets or three bolts and nuts, of which one bolt and nut 84 is seen in FIG. 1. The rotor 20 with its sleeve bearing 72 can slide freely in an axial direction along the motor shaft, and the second coupling 82 travels with the rotor. These couplings (keying elements) 81 and 82 are mechanically interengaged for permitting the rotor 10 to be shifted axially along the motor shaft while preventing the rotor from turning relative to the shaft, for example one of these couplings 81 or 82 has at least one recess such as a notch, groove or slot 86, and the other coupling has a projection or dog element 88 slidably received in this recess 86.

Figure 5:
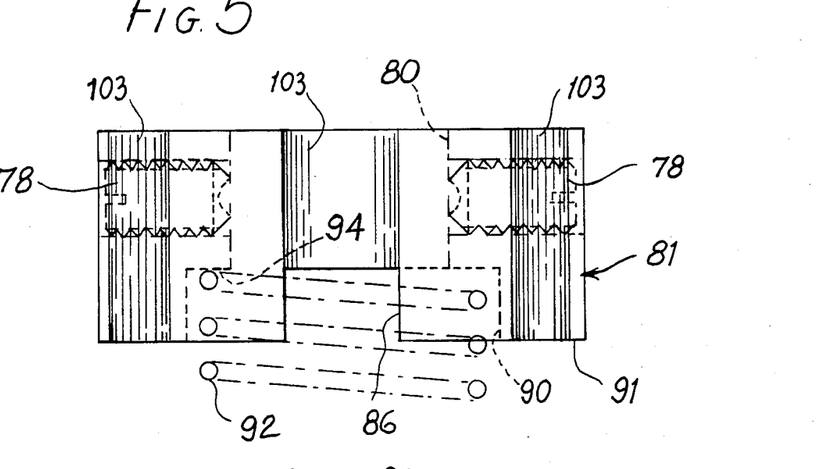
FIG. 5 is a considerably enlarged elevational view of a first coupling or keying element which is seen affixed to the motor shaft in FIG. 1.
Figure 6:
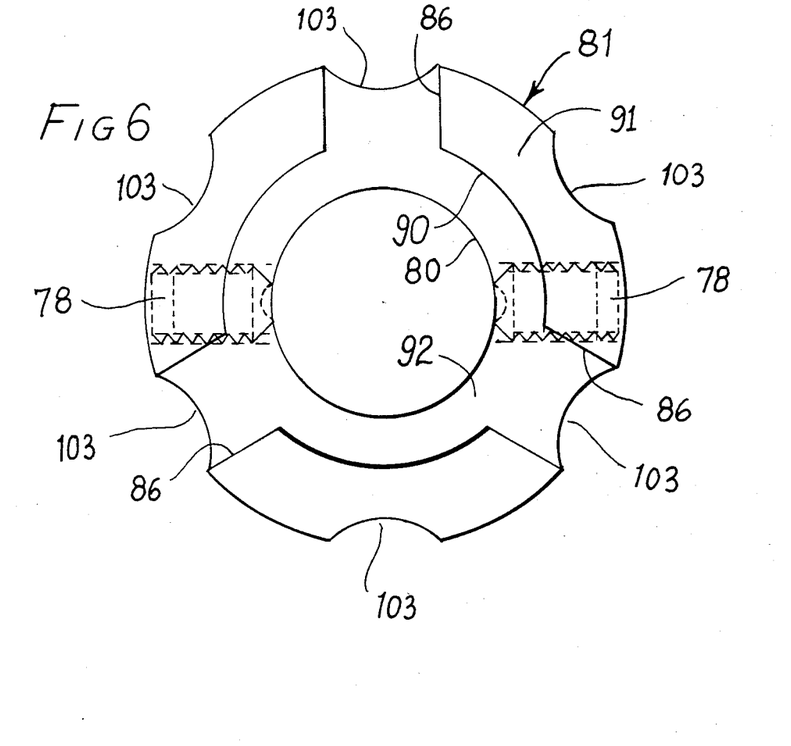
FIG. 6 is a bottom view of the first coupling (first keying element) shown in FIG. 5.

As shown enlarged in FIGS. 5 and 6, the first coupling (keying element) 81 has an axial shaft bore 80 for fitting snuggly onto the motor shaft to be rigidly affixed to the shaft by the fastening means 78. The first fan impeller 46 is shown in FIG. 1 affixed to this first coupling 81. This first coupling is shown as the one which has three axially extending recesses 86 in the form of three identical notches, grooves or slots extending axially from one end of this coupling. This first coupling 81 has a counter bore 90 of larger diameter than the shaft bore 80, thus forming a rim 91. The three recesses 86 are located in this rim 91. The counterbore 90 may be used to receive a compression spring 92, if desired, which thrusts against an annular shoulder 94 at the juncture of the counterbore 90 with the shaft bore 80. The purpose of this spring 92 is to apply an axial thrust to the rotor 20 to shift the rotor in a predetermined axial direction toward the second end of the housing 12 for applying braking action whenever the electrical power to the stator winding is shut off, as will be explained later.

Figure 2:
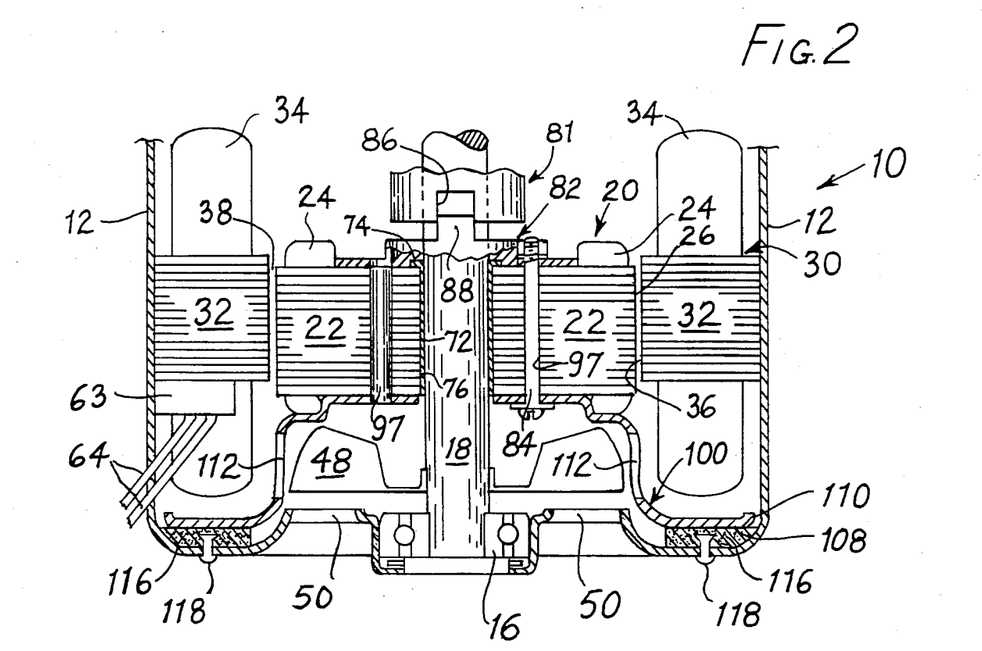
FIG. 2 is a partial elevational sectional view of the induction motor of FIG. 1 showing the motor in its off (non-running) position with the brake on, i.e. the brake action is applied to the rotor.

In the type of appliance 60, as shown in FIG. 1, having foot pads 56 for example, a food processor, the axis of the motor shaft 18 is oriented vertically, and thus the earth's gravitational field applies an axial thrust to the rotor 20 to shift the rotor in the predetermined axial direction for applying braking action whenever the electrical power to the stator winding is shut off. Consequently, in an electrical appliance having a vertically oriented motor shaft the compression spring 92 may be omitted, if desired. In FIG. 2 the rotor 20 is shown shifted along the axis of the motor shaft 18 toward the second end of the housing 12 in the direction for applying braking action, and thus the rotor is shown axially displaced slightly relative to the stator 30.

Figure 7:
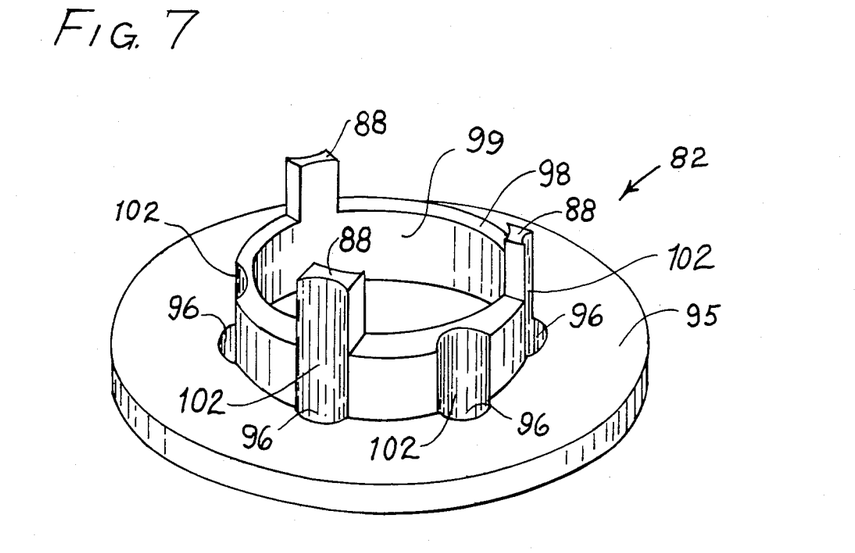
FIG. 7 is a considerably enlarged perspective view of a second coupling or keying element which is seen affixed to the rotor in FIG. 1.
Figure 8:
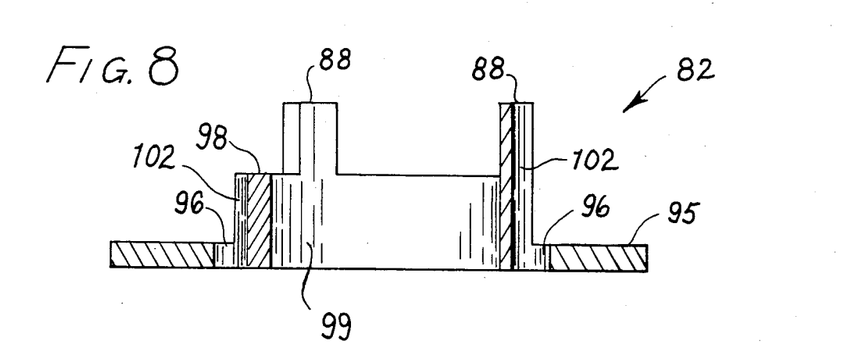
FIG. 8 is an elevational sectional view of the second coupling (second keying element shown in FIG. 7.

In FIGS. 7 and 8 is shown enlarged the second coupling (keying element) 82 which includes a base mounting flange 95 for seating down onto the rotor laminations 22. There are six mounting holes 96 in this flange 95, four of which can be seen in FIG. 7. These mounting holes 96 are aligned with six holes 97 in the rotor laminations 22 for receiving at least three fastening bolts and nuts 84. The second coupling 82 includes an annular wall 98 upstanding from the base flange 95. This wall 98 has the same diameter as the rim 91 of the first coupling 81, and there is a through-bore 99 inside this wall 98 having the same diameter as the counter bore 90 of the first coupling 81. Therefore, if the spring 92 (FIG. 5) is included, its free end as seen in FIG. 5 is received in the through bore 99 and seats down onto the bearing flange 74 and rotor laminations 22.

There are three of the projections or dog elements 88 upstanding from the wall 98, and these projections 88 are slidably received into the notches 86 (FIGS. 5 and 6) of the first coupling as seen in FIGS. 1 and 2 for causing the motor shaft to rotate when the rotor is turning and to stop when the rotor stops.

In order to provide clearance for ease in assembling the bolts and nuts 84 in the holes 97 in rotor laminations 22, there are six axially extending rounded grooves 102 in the exterior surface of the wall 98 and in the exterior surface of the axially extending projections 88. These rounded grooves 102 are aligned with the mounting holes 96 and aligned with corresponding rounded grooves 103 in the exterior surface of the first coupling 81.

Figure 3:
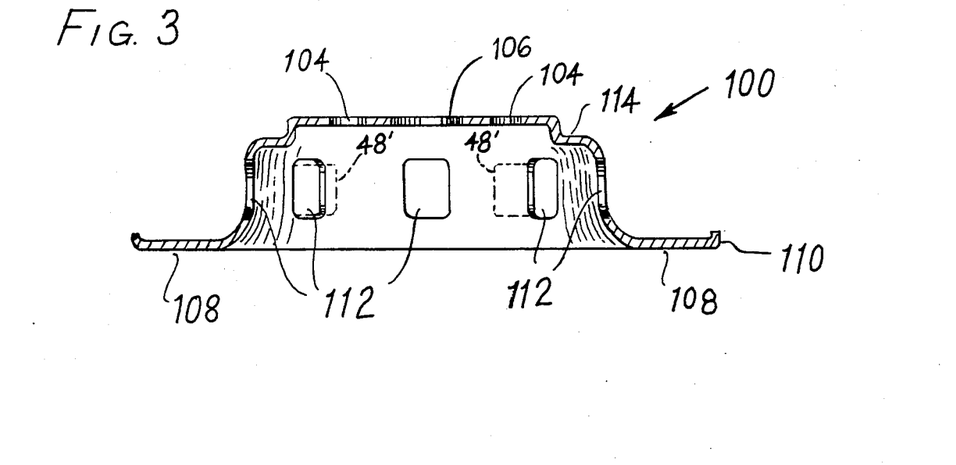
FIG. 3 is an elevational sectional view of a friction brake disc which is seen applied to the rotor in FIGS. 1 and 2.
Figure 4:
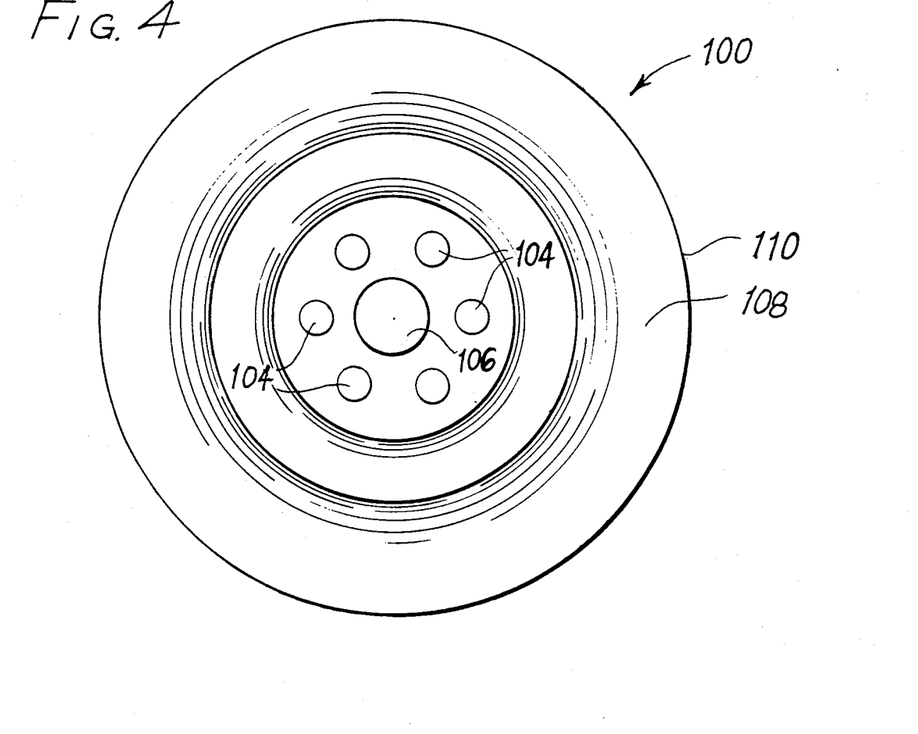
FIG. 4 is a bottom view of the friction brake disc of FIG. 3.

An inverted saucer-shaped friction brake disc 100 (FIGS. 3 and 4) is fastened rigidly to the opposite end of the rotor from the second coupling 82 by the bolts and nuts 84, as shown in FIGS. 1 and 2, which are inserted through mounting holes 104 (FIGS. 3 and 4). A central opening 106 provides clearance for the motor shaft 18 to extend freely through this opening. This brake disc 100 has a radially extending annular friction brake surface 108 located on a rim flange 110. In order to allow for the circulation of cooling air this brake disc 100 has a plurality of cooling windows 112 located in the inverted saucer-shaped wall near the second fan impeller 48, which is mounted on the motor shaft near the second bearing 16. An axial offset at 114 provides room for the rotor winding 24.

Mounted in the second or lower end of the motor housing 12 is an annular brake lining 116 of wear resistant material having a relatively high coefficient of friction, for example automotive brake lining material. This brake lining 116 is rigidly affixed to the housing 12 by suitable attachment means, for example by rivets 118 or by adhesive cement.

The operation of this braking method and apparatus will now be explained. When electrical power to the motor 10 is shut off, for example by opening the switch 62, the stator winding 34 becomes deenergized, and the magnetic field in the gap 38 between the stator and rotor laminations quickly decays, allowing the axial thrust on the rotor 20 caused by gravitation and/or by the compression spring 92 to shift the rotor in the axial direction toward the second end of the housing 12 for bringing the disc brake surface 108 into contact with the brake lining 116 for applying a strong braking action to the rotor. The rotor and shaft 18 are quickly braked to a stop. Advantageously, the annular brake lining 116 and the annular brake surface 108 are located at a relatively great radial distance from the axis of the shaft 18, thereby applying the braking action with a relatively long moment arm, i.e. at a considerable mechanical advantage relative to the perimeter 26 of the rotor 20. As seen in FIGS. 1 and 2 the brake lining 116 and brake surface 108 are located as far as possible from the motor axis while still being located within the motor housing 12.

As seen in FIG. 2, when the brake 108, 116 is applied, the rotor 20 has become shifted axially by a significant amount; for example the rotor is axially offset from the stator by an axial displacement in the range from 1/32 to 5/32 of an inch.

When the electrical power to the motor is turned on, for example by closing the switch 62, the stator winding 34 becomes energized and there is created a strong magnetic field in the gap 38. This magnetic field immediately overcomes the axial thrust of the spring 92 and/or of gravitation and immediately strongly pulls the axially displaced rotor (FIG. 2) back into axially aligned symmetrical relationship with the stator, as shown in FIG. 1. In other words, this magnetic field pulls the perimeter 26 of the rotor laminations 22 into symmetrical relationship with the inner surface 36 of the stator laminations 32. In energy terms, the magnetic attraction of the magnetic field in the gap 38 causes the rotor to shift axially to the position where there is minimum reluctance experienced by the magnetic field in the gap 38.

The instant that the rotor starts to move axially, the brake surface 108 separates from the brake lining 116, and the rotor is free to start rotating as it is shifting back toward its normal running position shown in FIG. 1.

If desired for stabilizing the axial position of the rotor during running, the upstanding wall 98 (FIGS. 7 and 8) of the second coupling can be positioned to abut against the rim 91 of the first coupling when the rotor is in its normal running position axially aligned with the stator, and thus the spacing shown for clarity of illustration in FIG. 1 between the couplings 81 and 82 would then be closed.

If desired, the second fan impeller 48 may be omitted, and then impeller blades 48' shown in dashed and dotted outline in FIGS. 3 and 4 are provided on the brake disc 100 and adjacent to a plurality of the cooling windows 112 for impelling air directly through the cooling windows 112 in the brake disc 100.

Figure 9:
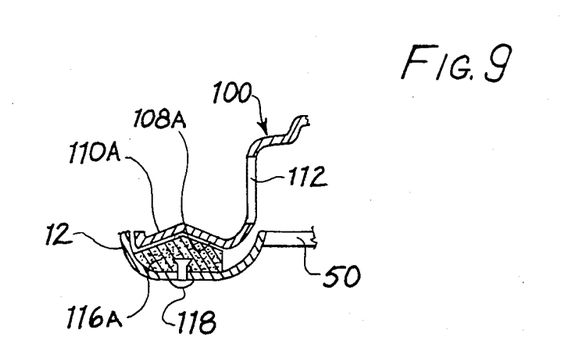
FIG. 9 is fragmentary elevational sectional view of a modified portion of the frictional brake disc and a modified portion of the associated friction brake lining which are seen in FIG. 2 for illustrating a modified embodiment of the invention.

In FIG. 9 is shown a modified annular friction brake disc 100 in which the rim flange 110A has an inverted V-shape for providing an annular inverted V-shaped channel friction brake surface 108A. The brake lining or pad 116A has an inverted V-shaped annular ridge for mating into the brake channel 108A. The advantage of these opposed sloping brake surfaces 108A and 116A is that they increase the contact areas of these opposed braking surfaces without increasing their overall radial span, thus obtaining more total area of braking surface in the same radial space, as compared with FIGS. 1 and 2. Moreover, due to their angle of slope relative to the radial direction, the contact force applied in a direction normal (perpendicular) to the friction surfaces 108A, 116A is increased generally as a function of the angle of sloping relative to the radial direction, for any given thrust applied in the axial direction. Consequently, this inverted V-shaped configuration increases the total area of braking contact and augments the force applied normal to the braking surface for a given applied axial thrust.

Since other changes and modifications varied to fit particular operating requirements and environments will become apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In an induction motor in a home electrical appliance, said induction motor including a housing, bearing means associated with the housing, a motor shaft within the housing mounted by said bearing means for rotation about its axis, said motor shaft extending outside of the housing and having power take-off means thereon external of said housing for enabling mechanical power to be delivered from said motor shaft to a working tool, a rotor in said housing mounted on said motor shaft, an electrically energizable electromagnetic stator fixed in said housing concentric with said rotor and encircling said rotor for causing said rotor to turn when said stator is electrically energized by alternating current, a friction braking system located totally inside of said housing for frictionally braking rotation of the rotor whenever the flow of electrical power to the motor ceases, said friction braking system comprising:

said rotor being shiftable in axial position relative to said stator, said rotor being shiftable in axial position relative to said motor shaft, a first coupling affixed to the motor shaft for the motor shaft and said first coupling to rotate as a unit, a second coupling affixed to the rotor for the second coupling and the rotor to relate as a unit and to shift axially as a unit, said second coupling being mechanically engaged with said first coupling for transmitting the rotary motion of the rotor to the motor shaft while permitting the rotor and said second coupling to shift axially with respect to said first coupling for preventing any angular displacement of said rotor relative to said shaft regardless of the axial position of said rotor, said rotor during running of said induction motor being drawn into axial alignment with the stator by the electromagnetic effect of the stator when electrically energized, said rotor being subjected to an axial thrust in a predetermined axial direction for shifting the rotor in a first axial direction out of aligment with the stator upon cessation of electrical energization of the stator, a brake lining mounted in fixed position within said housing, a brake disc secured to said rotor for causing said rotor and brake disc to rotate together and to stop together, said brake disc having an annular frictional surface concentric about said axis, said annular frictional surface being in opposed relationship with said brake lining and being spaced closely therefrom when said rotor is in axial alignment with said stator during running of said motor, said shifting of said rotor in said first axial direction bringing said annular frictional surface against said brake lining for frictionally braking the rotor to stop turning, and said rotor shifting in a second direction opposite to said first direction separating said annular frictional surface from said brake lining for releasing the friction braking upon electrical energization of said stator as said rotor is drawn into axial alignment with the stator and starts running.

2. In an induction motor in a home appliance, a friction braking system as claimed in claim 1, in which:
a spring is seated against said first coupling and thrusts said rotor in said first axial direction.

3. In an induction motor in a home appliance, a friction braking system as claimed in claim 1, in which:
said brake disc has cooling windows therein, and
fan impeller means are associated with said windows in said brake disc for circulating air through said windows for cooling said induction motor.

4. In an induction motor in a home appliance, a friction braking system as claimed in claim 3, in which:
said fan impeller means are fan blades attached to said brake disc near a plurality of said cooling windows.

5. In an induction motor in a home appliance, a friction braking system as claimed in claim 1, in which:
said housing has a generally cylindrical wall and has an end wall joining with said cylindrical wall, and
said brake lining has an annular configuration and is affixed to said end wall near said cylindrical wall.

6. In an induction motor in a home appliance, a friction braking system as claimed in claim 1, in which:
said brake lining has an annular configuration and has a surface sloping at an angle relative to a plane perpendicular to said axis, and
said annular frictional surface of said brake disc slopes parallel with said brake lining surface.

7. In an induction motor having a housing, bearing means within the housing, a motor shaft mounted by said bearing means for rotation, said motor shaft having power take off means thereon for enabling mechanical power to be delivered from said motor shaft, a rotor in said housing mounted on said motor shaft, an electrically energizeable electromagnetic stator in said housing concentric with said rotor and encircling said rotor for causing said rotor to turn when said stator is electrically energized by alternating current, braking apparatus located entirely within said housing for braking the rotation of the rotor when the alternating current is turned off comprising:
a first coupling fixed to the motor shaft for causing the motor shaft to rotate with said first coupling,
said rotor being shiftable in axial position relative to said motor shaft,
said rotor being subject to an axial thrust in a first direction,
a second coupling fixed to the rotor for causing the second coupling to rotate with said rotor and to shift axially with the rotor,
said second coupling being mechanically engaged with said first coupling for transmitting the rotary motion of the rotor to the motor shaft while permitting the rotor and said second coupling to shift axially with respect to said first coupling,
a brake lining fixed within the housing,
a brake disc fixed to the rotor for causing the brake disc to rotate with said rotor,
said brake disc frictionally engaging said brake lining upon axial shifting of said rotor in said first direction when the current is turned off for applying braking action to the rotor, and
said rotor being shifted in a second axial direction opposite to said first direction by electromagnetic action of the stator when the current is turned on for separating said brake disc from said brake lining for removing the braking action when the current is turned on.

* * * * *